United States Patent
Becker et al.

(10) Patent No.: US 7,092,326 B2
(45) Date of Patent: Aug. 15, 2006

(54) PLAYER FOR STORAGE MEDIA

(75) Inventors: Volker Becker, Hildesheim (DE); Holger Zimmermann, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 72 days.

(21) Appl. No.: 10/491,251

(22) PCT Filed: Sep. 20, 2002

(86) PCT No.: PCT/DE02/03545
§ 371 (c)(1),
(2), (4) Date: Nov. 16, 2004

(87) PCT Pub. No.: WO03/032318
PCT Pub. Date: Apr. 17, 2003

(65) Prior Publication Data
US 2005/0128890 A1 Jun. 16, 2005

(30) Foreign Application Priority Data
Oct. 4, 2001 (DE) ................................ 101 48 856

(51) Int. Cl.
*G11B 7/00* (2006.01)
(52) U.S. Cl. ................ 369/47.12; 369/47.13; 369/100; 369/30.05
(58) Field of Classification Search ........... 369/30.05, 369/83, 84, 100, 30.06, 30.02, 44.26, 47.12, 369/47.13
See application file for complete search history.

(56) References Cited

U.S. PATENT DOCUMENTS 5,455,926 A   10/1995  Keele et al.
5,719,886 A *  2/1998 Matsui et al. ............... 714/763
6,134,192 A   10/2000  Gorzelski

FOREIGN PATENT DOCUMENTS

DE  100 14 987   10/2001
EP    0 908 884    4/1999

OTHER PUBLICATIONS

Sven Hansen, Peter Monnerjahn, Peter Nonhoff-Arps: "Mobiles Musikarchiv" C'T Magazin Für Computer Technik 17/2001, Aug. 13, 2001, pp. 84-91, XP 002230306.

* cited by examiner

Primary Examiner—Nabil Hindi
(74) Attorney, Agent, or Firm—Kenyon & Kenyon LLP

(57) ABSTRACT

A player for storage media having a number of data groups is provided, which player enables a data group to be selected in a clearly organized way, particularly when a large number of data groups is stored on such a storage medium. In this context, a read head is provided for reading out the data of a first storage medium, and a read-head control is provided for positioning the read head in the area of a data group to be played, which data group is stored on the first storage medium. In addition, an input unit is provided where, on the one hand, various storage media and, on the other hand, various data groups, are selectable on a selected storage medium to be played. A conversion device is provided, which, in response to the number of data groups on the first storage medium exceeding a predefined value, forms at least two subsets from the number of data groups of the first storage medium, each of these subsets at the input unit being selectable as a different storage medium. The conversion device drives the read-head control as a function of the subset selected as storage medium at the input unit, to position the read head.

8 Claims, 2 Drawing Sheets

PLAYER FOR STORAGE MEDIA

FIELD OF THE INVENTION

The present invention is directed to a player for storage media.

BACKGROUND INFORMATION

Players for storage media, e.g., in the form of compact-disk changers, are known in the art. In this context, in the operation of an input unit, on the one hand, a selection can be made among various compact disks and, on the other hand, a selection can be made among the titles on the selected compact disk. The selected compact disk is then placed in a play position. A read-head control then positions a read head, for example at the beginning of the selected title of the compact disk to be played, to enable this title to be played.

SUMMARY

In contrast, the player for storage media according to the present invention has the advantage that a conversion device is provided, which, in response to the number of data groups on the first storage medium exceeding a predefined value, forms at least two subsets from the number of data groups of the first storage medium, each of these subsets at the input unit being selectable as a different storage medium, and that the conversion device drives the read-head control as a function of the subset selected as storage medium at the input unit, to position the read head. This enables a user to manage a storage medium having a large number of data groups in a more clearly organized way, and the corresponding data groups to be selected in a more targeted manner. This applies, for example, to storage media on which data are stored in compressed form and which, therefore, are able to accommodate large volumes of data.

In accordance with an example embodiment of the present invention, the conversion device checks whether a storage medium selected at the input unit is at least a second storage medium or a subset of data groups of the first storage medium, and, in dependence upon the selected storage medium, brings either the first storage medium or the at least one second storage medium into a play position. This renders possible a mixed operation for the player, where various storage media are selectable for placement in the play position, as are various virtual storage media whose data are stored on one single storage medium that is able to be placed in the play position.

In accordance with an example embodiment of the present invention, the conversion device checks whether a storage medium selected at the input unit is a subset of data groups of the first storage medium or a subset of data groups of at least one third storage medium, and, in dependence upon the selected storage medium, brings either the first storage medium or the at least one third storage medium into a play position. This enables one to select as well, at the input unit of the player, virtual storage media whose data are stored on various storage media that are able to be transferred to the play position of the player.

DETAILED DESCRIPTION

Figure 1:
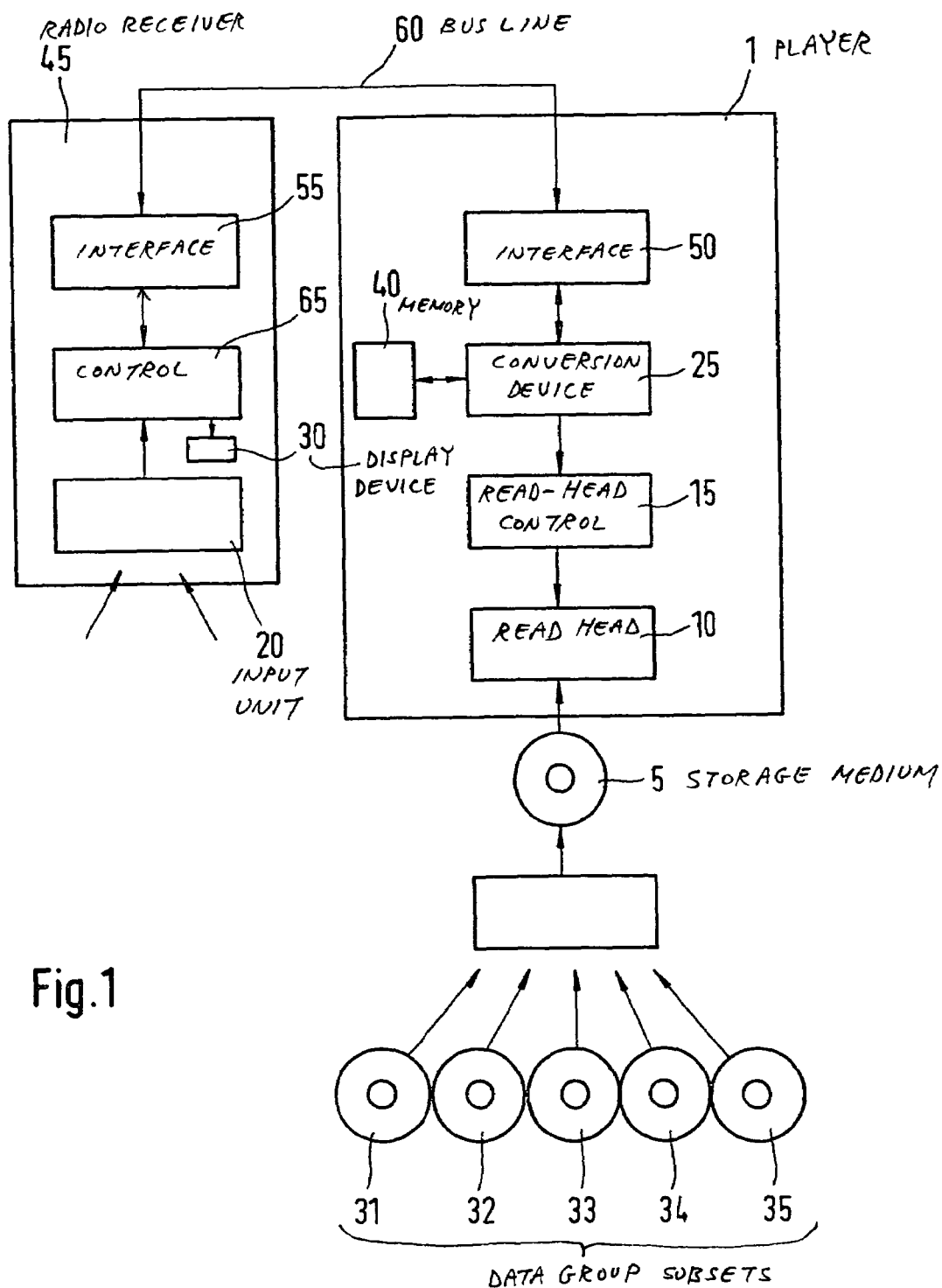
FIG. 1 shows a block diagram of a first exemplary embodiment of a player according to the present invention.

In FIG. 1, a player 1 for storage media is shown. In this context, player 1 may be designed, for example, to play disk-shaped storage media, such as compact disks, mini-disks, DVDs (digital versatile disks), or the like. Player 1 is then designed accordingly as a compact disk player, mini-disk player, DVD player, or the like. Data are recorded, for example in data tracks, on a storage medium that is able to be played on player 1. Player 1 includes a read head 10 for reading out the data from the data tracks of a first storage medium 5 inserted into player 1. For the read-out operation, first storage medium 5 is placed in a play position in player 1. The read-out process using read head 10 may be carried out optically, for example, by a laser beam focused at the storage medium and reflected off of the same. In addition, player 1 includes a read-head control 15 coupled to read head 10 for positioning read head 10 over a data track to be read out of first storage medium 5. Furthermore, player 1 includes a conversion device 25, which is likewise coupled to read-head control 15 and which may be linked to a memory 40 of player 1. In accordance with FIG. 1, an input unit 20 assigned to player 1 is also provided. This may be designed as part of player 1 itself or, as shown in FIG. 1, be configured remotely from player 1. Input unit 20 is connected to conversion device 25. Furthermore, as shown in FIG. 1, a display device 30 may be provided, which may be designed as part of player 1 or, as shown in FIG. 1, positioned remotely from player 1 and optionally connected to conversion device 25.

In the first exemplary embodiment shown in FIG. 1, player 1 is connected to a radio receiver 45. Radio receiver 45 may be, for example, a car radio. For connection to radio receiver 45, player 1 includes a first interface 50, and the radio receiver includes a second interface 55. The two interfaces 50, 55 are interconnected via a bus line 60. Input unit 20 and display device 30 of player 1 also function here as input unit and display device of radio receiver 45 and are each connected via a control 65 of radio receiver 45 to second interface 55.

Depending on the design of second interface 55 and bus line 60, a player 1 may be connected to radio receiver 45. In accordance with the first exemplary embodiment according to FIG. 1, only one storage medium may be introduced into the player at any given time. In accordance with a second embodiment according to FIG. 2, a plurality of storage media, designed, for example, as compact disk changers, mini-disk changers, DVD disk changers or the like, may be simultaneously introduced into the player. To enable both the player in accordance with the first embodiment, as well as the player in accordance with the second embodiment, to be connectible to radio receiver 45, input unit 20 facilitates both the selection of a storage medium, as well as the selection of a data group stored on the selected storage medium, for example, of a music title or of a video clip. In this context, input unit 20 may have at least one scroll key for selecting, at display device 30, one of the storage media contained in player 1. Furthermore, a data group may be selected by at least one scroll key likewise provided at input unit 20. In addition, input unit 20 may include a confirmation key, which, when actuated, confirms the selected storage medium and the selected data group in each instance, thereby enabling the play operation to be initiated.

At this point, in accordance with the first embodiment according to FIG. 1, the case is considered where a multiplicity of data groups is stored on first storage medium 5. To economize on storage space on first storage medium 5, data groups may be encoded using a compression method characterized in FIG. 1 by reference numeral 75. As a compression method, the MP3 method (MPEG layer-3; MPEG=motion picture expert group) may be used, for example. If, at this point, first storage medium 5 is inserted into player 1, read head 10 initially reads out a so-called start-up or TOC (table of contents) area of first storage medium 5, which includes a table of contents of the data stored on first storage medium 5. From this table of contents, conversion device 25, which is supplied with this information, takes the number of data groups stored on first storage medium 5. If this number exceeds a predefined value, then conversion device 25 categorizes the data groups stored on first storage medium 5 into at least two subsets, the data groups of various subsets being able to be expediently distinguished from one another, although this is not required, and the number of subsets to be formed being selected in such a way that the number of data groups does not exceed the predefined value in any subset. Conversion device 25 categorizes the data groups of first storage medium 5, for example, into five subsets 31, 32, 33, 34, 35. As a result of the data compression, the data of the five subsets 31, 32, 33, 34, 35 are thus able to be stored on first storage medium 5.

Via bus line 60, conversion device 25 then sends information pertaining to generated subsets 31, 32, 33, 34, 35, as well as information pertaining to the data groups contained in each of them, to radio receiver 45. Via control 65, this information may be reproduced at display device 30. This reproduction may take place automatically, as soon as control 65 has received the corresponding information from conversion device 25. In the process, individual subsets 31, 32, 33, 34, 35 may be individually reproduced in each instance with the data groups contained in each of them, at display device 30. In the process, the information of each subset 31, 32, 33, 34, 35 may be reproduced in the manner of the information of a storage medium in each instance at display device 30. A reproduction of this kind may also be initiated in input unit 20 by the user of radio receiver 45, for example, in the sense of an editing operation. In this manner, the user may designate the individual subsets 31, 32, 33, 34, 35 using an alphanumeric keyboard at input unit 20, each subset 31, 32, 33, 34, 35 then being treated as a separate storage medium and being provided with a name. Control 65 may route this name information via second interface 55, bus line 60, and first interface 50 to conversion device 25, which stores the individual names in association with generated subsets 31, 32, 33, 34, 35 in memory 40. At input unit 20, each of subsets 31, 32, 33, 34, 35 formed is now able to be selected as a different storage medium using the scroll keys provided for that purpose. In the process, subsets 31, 32, 33, 34, 35 are characterized at the display device either by the name assigned by the user or, when none exists, by an original name assigned by conversion device 25.

Depending on the selection of a subset 31, 32, 33, 34, 35 at input unit 20, read head 10, as long as this selection is valid, is positioned by read-head control 15 in the areas of first storage medium 5 where data groups of selected subset 31, 32, 33, 34, 35 are stored. In the process, subsets 31, 32, 33, 34, 35 may be formed in such a way that their data groups on first storage medium 5 are adjacent to one another to prevent read head 10 from experiencing large track jumps when changing data groups within same subset 31, 32, 33, 34, 35. However, the data groups of the particular subsets 31, 32, 33, 34, 35 do not necessarily have to be adjacent to one another.

Since, at this point, individual subsets 31, 32, 33, 34, 35 are reproduced in each instance as a separate storage medium for the user at display device 30 and are able to be selected and designated by input unit 20, the operation of player 1 and, in particular, the selection of data groups from first storage medium 5 are considerably clearer and less time-consuming for the user. Thus, using input unit 20, as when working with a conventional storage medium, the user is able to program a play sequence for at least a portion of the data groups contained in a subset 31, 32, 33, 34, 35 edited directly at display device 30.

The following describes how the selection of a subset 31, 32, 33, 34, 35 and of a data group of the selected subset is converted by the user at input unit 20 into the corresponding data group of first storage medium 5 for correct positioning of read head 10. In this context, the user initially selects a desired storage medium or a desired subset 31, 32, 33, 34, 35 at input unit 20, for example, by inputting the name at the alphanumeric keyboard or by scrolling through names displayed at display device 30. Subsequently, either by using the alphanumeric keyboard or by scrolling through the corresponding numbers at display device 30, he/she outputs a data group number relating to selected subset 31, 32, 33, 34, 35. In this context, the individual data groups of each subset 31, 32, 33, 34, 35 may be numbered consecutively, for example, from one on. For this example, it shall be assumed that the user at input unit 20 has selected the name of third subset 33 and the data-group number two. The data are then transmitted from control 65 via second interface 55, bus line 60, and first interface 50, to conversion device 25. At this point, by comparing the name selected by the user to the names stored in memory 40, conversion device 25 ascertains the assigned third subset 33, whose address data are stored in memory 40 in association with the selected name. The address data thereby indicate the positions of the data groups belonging to third subset 33, on first storage medium 5. On the basis of the data group number two selected by the user, the address data for the corresponding data group may then be determined on first storage medium 5, which data are stored for third subset 33 in memory 40 in association with data group number two. Conversion device 25 then drives read-head control 15 to position read head 10 at the start address of this data group on storage medium 5. This data group is subsequently read out by read head 10 and played back at a playback device not shown in the figure.

When, in the first exemplary embodiment according to FIG. 1, the number of data groups on first storage medium 5 is less than or equal to the predefined value, then no division of data groups into subsets takes place, and player 1 functions in the conventional manner, for example, as a compact disk player, mini-disk player, or DVD player. It is no longer possible then to select various storage media at input unit 20, even if such an input is provided in principle.

Figure 2:
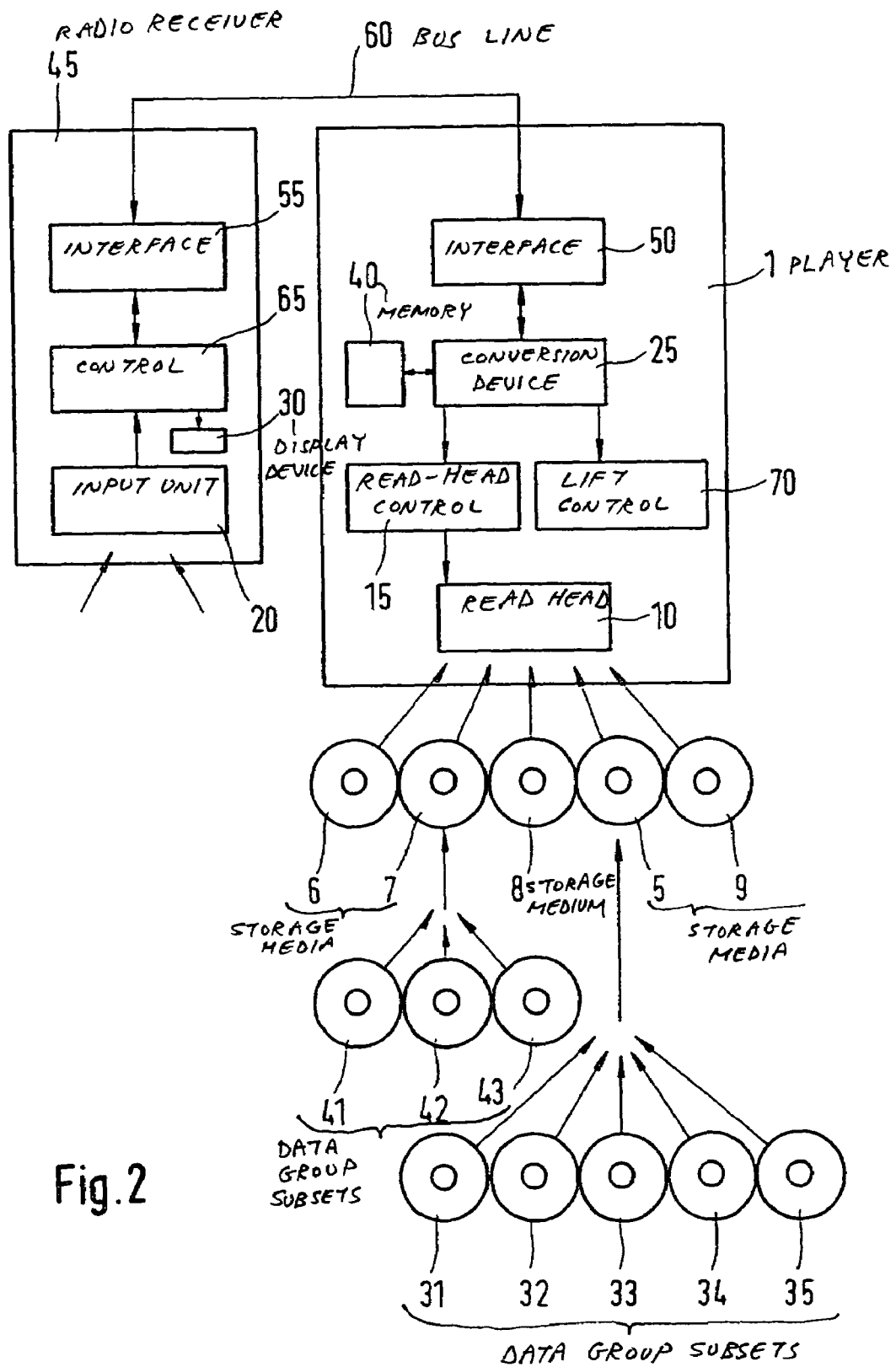
FIG. 2 shows a block diagram of a second exemplary embodiment of the player according to the present invention.

A second example embodiment of player 1 according to the present invention is shown in FIG. 2, with the same reference numerals characterizing the same elements as in the exemplary embodiment according to FIG. 1. In this context, radio receiver 45 of the second exemplary embodiment according to FIG. 2 corresponds to that of the first embodiment according to FIG. 1. Player 1, on the other hand, is designed at this point as a changer, for example as a compact disk changer, into which a plurality of storage media may be introduced simultaneously. To this end, player 1 additionally includes a lift control 70 which drives a sliding mechanism not shown in FIG. 2, to bring a selected storage medium into a play position in which the data stored on the selected storage medium are able to be read out by read head 10. In this context, the storage media inserted in player 1 may be stacked in a magazine (feeding attachment) and, from there, transferred by the sliding mechanism to the play position or transported from the play position back to the magazine. In this example, first storage medium 5 from the first exemplary embodiment according to FIG. 1, a second storage medium 6, a third storage medium 7, a fourth storage medium 8, and a fifth storage medium 9 are assumed to be already stored in the magazine (not shown in FIG. 2) of player 1. On the basis of the check test described in connection with the first exemplary embodiment to verify whether the number of data groups of the particular storage medium 5, 6, 7, 8, 9 has exceeded the predefined value, in the second exemplary embodiment, conversion device 25 performs, for first storage medium 5, a division of data groups into five subsets 31, 32, 33, 34, 35, and, in the case of third storage medium 7, a division into three subsets 41, 42, 43. In this context, the division into the subsets is carried out as already described with respect to the first exemplary embodiment. While in the first exemplary embodiment the user is offered five "virtual" storage media for selection using input unit 20, in the second exemplary embodiment, the user is offered eleven, namely first subset 31, second subset 32, third subset 33, fourth subset 34, fifth subset 35, second storage medium 6, sixth subset 41, seventh subset 42, eighth subset 43, fourth storage medium 8 and fifth storage medium 9.

In the device according to the present invention, all subsets 31, 32, 33, 34, 35, 41, 42, 43 are interpreted, as in the first exemplary embodiment, by conversion device 25, as a separate storage medium, so that, via first interface 50, bus line 60, and second interface 55, conversion device 25 transmits information pertaining to the eleven storage media to control 65, in particular for display at display device 30. In contrast to storage media 5, 6, 7, 8, 9 actually present, generated subsets 31, 32, 33, 34, 35, 41, 42, 43 represent virtual storage media. However, this is not discernible to the user. In the manner described in connection with the first exemplary embodiment, the user is able to designate names for the storage media or program a play sequence for one or more of the storage media, regardless of whether the particular storage medium is virtual or physical. Assigned to the name allocated by the user in memory 40 is either an address information pertaining to one of subsets 31, 32, 33, 34, 35, 41, 42, 43 coupled with the corresponding storage medium 5, 7, or information regarding storage medium 6, 8, 9. The latter is only involved when the number of data groups on the corresponding storage medium is less than or equal to the predefined value and, therefore, no data group subsets are generated.

To facilitate selection of the correct storage medium or the correct subset, in the second exemplary embodiment, conversion device 25 includes an expanded functionality that allows it to verify whether the name input by the user at input unit 20 is a subset, and thus a virtual storage medium, or a real storage medium. To this end, conversion device 25 compares the name entered by the user at input unit 20 with the names stored in memory 40. If, in this context, a real storage medium 6, 8, 9 is assigned to the name entered, then conversion device 25 prompts lift control 70 to transfer selected storage medium 6, 8, 9 to the play position if this storage medium is not already in that position. If a virtual storage medium, i.e., one of subsets 31, 32, 33, 34, 35, 41, 42, 43 in memory 40, is assigned to the input name, conversion device 25 then checks whether first storage medium 5 or third storage medium 7 is assigned to this subset in memory 40 and prompts lift control 70 to transfer the assigned storage medium to the play position, if this storage medium is not already in that position.

As described with reference to the first exemplary embodiment, the data group selected by the user at input unit 20 is then ascertained when the user, via input unit 20, has selected a subset and, thus, a virtual storage medium. If the user has selected a real storage medium 6, 8, 9, then the data group number selected by the user at input unit 20 in memory 40 corresponds to relevant address data which characterize the location of the data group to be played on the desired storage medium, so that conversion device 25 is able to prompt read-head control 15 to position read head 10 at the start of this data group on selected storage medium 6, 8, 9.

Radio receiver 45 and player 1 may be configured in a shared housing or, as described in the two exemplary embodiments, be physically separate from one another.

The data and information exchange via bus line 60 may be carried out in accordance with a predefined message catalog and a predefined protocol, control 65 converting the user inputs intended for player 1 at input unit 20 into corresponding commands which are then output via second interface 55 to bus line 60, using the predefined message catalog and the predefined protocol for transmission to player 1.

What is claimed is:

1. A player for storage media containing a plurality of data groups, comprising:
   a read head for reading data from at least one storage medium;
   a read-head control for positioning the read head in an area of the storage medium containing a data group to be read;
   an input unit for selecting at least one of a desired storage medium and a desired data group; and
   a conversion device for assigning each data group contained in the at least one storage medium into one of at least two subsets, if the number of data groups contained in the at least one storage medium exceeds a predefined value, wherein a desired subset is selected by a user input at the input unit, and wherein the conversion device drives the read-head control as a function of the selected subset for positioning the read head.

2. The player according to claim 1, further comprising a display device for displaying at least one subset and information regarding the data groups contained in the at least one subset.

3. The player according to claim 2, wherein the at least one subset is edited by using the input unit.

4. The player according to claim 3, wherein, by using the input unit, a name is assigned to the at least one subset and stored in a memory in association with the at least one subset.

5. The player according to claim 3, wherein, by using the input unit, a play sequence of at least one portion of the data groups contained in the at least one subset is programmed.

6. The player according to claim 1, wherein the player is configured to handle a plurality of discrete storage media, and wherein one of a storage medium identifier and a subset identifier is selected by a user, and wherein, on the basis of the selected one of the storage medium and the subset, and on the basis of a data group selected from the selected one of the storage medium and the subset, the conversion device ascertains the location of the selected data group on one of the selected storage medium and a storage medium containing the selected subset, and wherein, on the basis of the ascertained location of the selected data group, the conversion device drives the read-head control to position the read head at the start of the selected data group on the corresponding storage medium containing the selected data group.

7. The player according to claim 6, wherein, on the basis of the selected one of the storage medium and the subset, the conversion device controls positioning of one of the selected storage medium and the storage medium containing the selected subset into a play position.

8. The player according to claim 4, wherein the player is configured to handle a plurality of discrete storage media, and wherein one of a storage medium identifier and a subset identifier is selected by a user, and wherein, on the basis of the selected one of the storage medium and the subset, and on the basis of a data group selected from the selected one of the storage medium and the subset, the conversion device ascertains the location of the selected data group on one of the selected storage medium and a storage medium containing the selected subset, and wherein, on the basis of the ascertained location of the selected data group, the conversion device drives the read-head control to position the read head at the start of the selected data group on the corresponding storage medium containing the selected data group.

* * * * *